April 6, 1965 P. J. LANE ETAL 3,177,295

SELF-REGULATING TWO-TERMINAL IMPEDANCE NETWORKS IN TELEPHONE SUBSTATION CIRCUITS

Filed March 2, 1962

United States Patent Office
3,177,295
Patented Apr. 6, 1965

3,177,295
SELF-REGULATING TWO-TERMINAL IMPEDANCE NETWORKS IN TELEPHONE SUBSTATION CIRCUITS

Peter John Lane, London, and Rodney Edward William Wheeler, Erith, Kent, England, assignors to Associated Electrical Industries Limited, London, England, a British company Filed Mar. 2, 1962, Ser. No. 177,033
Claims priority, application Great Britain, Mar. 20, 1961, 10,085/61
2 Claims. (Cl. 179—81)

Figure 1:
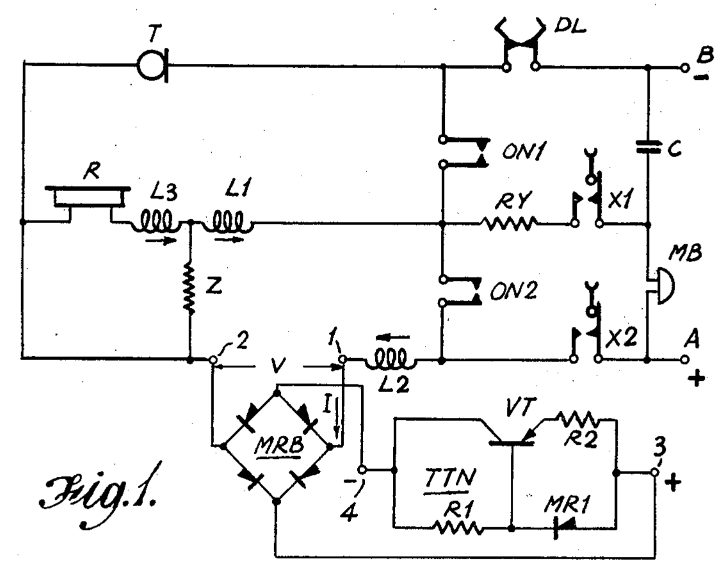

This invention relates to self-regulating two-terminal impedance networks and their use in telephone system substation circuits.

Herein, the expression "self-regulating" applied to a two-terminal impedance network means that the network is so constituted that the impedance it presents between its two terminals changes significatntly with significant changes of the current passed through it, and the term "impeedance" is used in a broad sense to include within its scope wherein appropriate what is effectively direct-current resistance.

Of late years, considerable effort has been directed, with considerable success, to the development of subscribers' telephone sets having (for example owing to the use of receivers and transformers of considerably improved performance) increased sending and receiving sensitivities and enabling longer or lighter-gauge subscribers' lines to be used. As is well known, a difficulty that arises in this regard is that, unless special provision is made, in the case of short local (subscribers') lines the increased sending and receiving sensitivities become a source of embarrassment by giving excessively loud reception. Various arrangements for overcoming this difficulty have already been used or proposed. In one known arrangement, a "dropping" resistor is wired in series with a line winding of an anti-sidetone induction coil of a substation circuit as part of the substation circuit, and provision is made to enable a linesman readily to fix a shorting link in position to short-circuit this resistor when the telephone set concerned is installed in association with a long local line. In the case of other known arrangements, a substation circuit is provided with an automatic regulating arrangement affording a measure of automatic regulation of sensitivity in dependence upon the magnitude of the direct current flowing in the line wires and supplied from the exchange, i.e. (in practice) in dependence upon the resistance of the line concerned.

In one aspect, the present invention provides a self-regulating two-terminal impedance network of a form that may, in a suitable practical realisation, be employed in a telephone system substation circuit as an automatic regulating arrangement, for effecting automatic sensitivity regulation in dependence upon the magnitude of the direct current flowing in the line wires and supplied from the exchange which is broadly the automatic, but nevertheless static, equivalent of the "dropping" resistor and shorting link arrangement previously mentioned.

In another aspect, the present invention provides an improved automatic regulating arrangement for effecting automatic sensitivity regulation in a telephone system substation circuit in dependence upon the magnitude of the direct current flowing in the line wires and supplied from the exchange, the arrangement being of a static character and being one suited for inclusion in a substation circuit of such circuit configuration, as regards the operative interconnection of the transmitter and receiver and an anti-sidetone induction coil, that sensitivity regulation is most conveniently and most suitably effected by means of what is in effect a two-terminal variable resistance arrangement included in series with a line winding of the anti-sidetone induction coil.

According to one main feature of the invention, there is provided a self-regulating two-terminal impedance network wherein a first direct-current path between the two terminals of the network includes the emitter-collector path of a transistor and a second direct-current path between said two terminals includes a rectifier or diode and at least one resistor or other resistive element in series with this rectifier or diode, and wherein the base electrode of the transistor is conductively connected, to provide for the control of the transistor, to a point in said second direct-current path intermediate components included therein, the network as a whole being such that when a direct current passed through the network between the two terminals thereof has a value within a lower part of a working or catered-for range of values of such current the direct-current voltage across the rectifier or diode is such that this rectifier or diode is of relatively high resistance and by reason of this causes the transistor to be in effect turned on to cause said first direct-current path to be of relatively low impedance, and being such that when a direct current passed through the network between the two terminals thereof has a value within an upper part of said range the direct-current voltage across the rectifier or diode is such that this rectifier or diode is of relatively low resistance and by reason of this causes the transistor to be in effect turned off to cause said first direct-current path to be of relatively high impedance, and being such that the impedance of said first direct-current path plays a significant part in determining the impedance the network as a whole presents between its two terminals.

According to another main feature of the invention, there is provided, in a telephone system substation circuit, an automatic regulating arrangement, for effecting automatic sensitvity regulation in dependence upon the magnitude of the direct current flowing in the line wires and supplied from the exchange, which comprises a self-regulating two-terminal impedance network connected in series with a line winding of an induction coil of the substation circuit, this impedance network being a network in accordance with the first-mentioned main feature.

Figure 2:
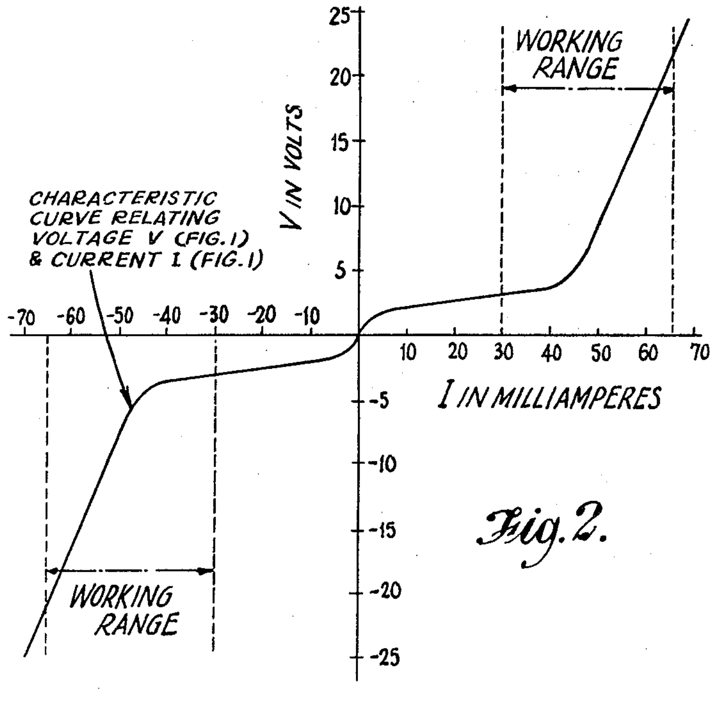

The previously-mentioned and other features of the invention are exemplified in the specific embodiment of the invention which will now be described with reference to the accompanying drawings. This specific embodiment takes the form of a telephone system substation circuit provided wtih an anti-sidetone induction coil and with an automatic regulating arrangement for effecting automatic sensitivity regulation in dependence upon the magnitude of the direct current flowing in the line wires and supplied from the exchange. FIG. 1 of the drawings is a circuit diagram of the substation circuit concerned, and FIG. 2 shows the form of a characteristic curve pertaining to this substation circuit.

Referring firstly to FIG. 1, the substation circuit has two line terminals A and B to which are connected, when the circuit is equipped for use at a subscriber's premises, the two line wires of the subscriber's line. The anti-sidetone induction coil of the substation circuit has three windings L1, L2, and L3. When two switch-hook contacts X1 and X2 are in their closed conditions, and a dial impulsing contact DL is in its closed condition, and two dial off-normal contacts ON1 and ON2 are in their open conditions, that is, when the substation circuit as a whole is in the conversational condition, the connections of the three windings of the induction coil are such that the anti-sidetone effect is obtained in known manner. Ignoring the path through the winding of a magneto bell MB, these connections are such that (i) the receiver R and the winding L3 are connected in series across a resistor Z, (ii) the winding L2 (the line winding) is traversed by the whole of the line current, and (iii) a capacitor C, a resistor RY, the winding L1, and the resistor Z (shunted by the receiver R and the winding L3) form in series with one another a branch in parallel with the transmitter T. When the switch-hook contacts X1 and X2 are open, the only elements of the substation circuit which are effectively in circuit are the magneto bell MB of the substation circuit and the capacitor C, which elements are as is usual permanently connected in series with each other across the line terminals A and B. During dialling, the dial off-normal contact ON1 connects the resistor RY and the capacitor C to form a spark-quenching circuit for the dial impulsing contact DL. The resistances of the windings L1, L2 and L3 of the induction coil may be 56 ohms, 29 ohms and 38 ohms respectively, and the resistances of the resistors Z and RY may be 120 ohms and 33 ohms respectively.

In accordance with the invention, the substation circuit is provided with an automatic regulating arrangement comprising a self-regulating two-terminal impedance network TTN connected in series with the line winding L2 of the induction coil. This two-terminal impedance network has terminals 3 and 4, and is shown as being connected in series with the winding L2 through the medium of a rectifier bridge MRB. In cases where there is no likelihood of the occurrence of reversals of line polarity and it can be ensured that the connections of the line wires to terminals A and B are such that as regards these connections terminals A and B are positive and negative terminals respectively as shown, then the rectifier bridge may be omitted, terminal 3 being directly connected to terminal 1 and terminal 4 being directly connected to terminal 2. When provided as shown, the rectifier bridge renders it immaterial, so far as the two-terminal impedance network TTN is concerned, whether terminals A and B are positive and negative terminals respectively, or negative and positive terminals respectively.

The self-regulating two-terminal impedance network TTN comprises a transistor VT, a rectifier or diode MR1, and two resistors R1 and R2. A first direct-current path between its two terminals 3 and 4 comprises, in series, the resistor R2 and the emitter-collector path of the transistor VT, and a second direct-current path between these terminals comprises, in series, the rectifier or diode MR1 and the resistor R1. The resistors R1 and R2 may have values of 1000 ohms and 10 ohms respectively. The transistor VT serves in effect as an automatically controlled variable resistance.

In the case where the substation circuit is installed in association with a relatively long local line, so that the line current passed through the network TTN is relatively low (e.g. 30 to 42 milliamperes D.C.), the automatic regulating arrangement comprising this network and connected between terminals 1 and 2 offers a minimum attenuation. This is because with such a relatively low line current passing through the network TTN the rectifier or diode MR1 is of relatively high resistance (the voltage across this rectifier or diode being insufficient to cause conduction of this rectifier or diode in the forward direction), and as a result of this the base of the transistor VT is held negative with respect to the emitter so that this transistor is in effect turned on to cause said first direct-current path between terminals 3 and 4 to be of relatively low impedance.

In the case where the substation circuit is installed in association with a relatively short local line, so that the line current passed through the network TTN is relatively high (e.g. higher than 60 milliamperes D.C.), the automatic regulating arrangement comprising this network and connected between terminals 1 and 2 offers a maximum attenuation. This is because with such a relatively high line current passing through the network TTN the rectifier or diode MR1 is conducting (the voltage across this rectifier or diode being sufficient, owing to the voltage drop occurring across the resistor R2, to cause conduction of this rectifier or diode in the forward direction), and as a result of this the base of the transistor VT is held positive with respect to the emitter so that this transistor is in effect turned off to cause said first direct-current path between terminals 3 and 4 to be of relatively high impedance. The fact that the rectifier or diode MR1 is conducting effectively connects, so far as attenuation is concerned, the resistor R1 in circuit between terminals 3 and 4, but the resistance of resistor R1 is made sufficient (e.g. 1000 ohms) to ensure that the automatic regulating arrangement nevertheless offers a maximum attenuation between terminals 1 and 2 in the case being considered.

The automatic regulating arrangement serves to impose a limit (e.g. 65 milliamperes) on the magnitude of the direct current that flows through the transmitter T, and this is advantageous in reducing any tendency for the carbon granule transmitters of a system to go "noisy" as a result of beting subjected to excessive current loading.

Referring now to FIG. 2, this shows the form of a characteristic curve pertaining to the substation circuit of FIG. 1 and indicating the relationship between the voltage V across terminals 1 and 2 and the current I flowing between these terminals by way of the rectifier bridge MRB and the self-regulating impedance network TTN. From a consideration of the form of this characteristic curve, it will be apparent that, as regards a working range of magnitudes of the current I extending from 30 milliamperes to 65 milliamperes, increase of the current magnitude from the lower limit to the upper limit of the range causes the differential resistance presented by the path between terminals 1 and 2 by way of the rectifier bridge MRB and the network TTN to increase in a proportion which is considerably greater than the corresponding proportion in which the ordinary direct current resistance presented by this path increases. For current magnitudes of 30 milliamperes and 65 milliamperes, the differential resistances presented by the path just mentioned are in fact 30 ohms and 850 ohms respectively, while the corresponding ordinary direct current resistances are 83 ohms and 320 ohms respectively. The large change in differential resistance is, of course, the major factor in the automatic regulating action.

What we claim is:

1. A self-regulating two-terminal impedance network for performing an automatic regulating action by presenting between its two terminals, while direct current is passing through it from a positive one of these two terminals to a negative one of these two terminals, a differential resistance of a magnitude varying in such manner in dependence on the value of such direct current as to be relatively low when this value is within a lower part of a working range of values of such direct current and to be relatively high when this value is within an upper part of said range, said impedance network comprising in combination:

(a) a first terminal constituting one of the two terminals of the network, (b) a second terminal constituting the other of the two terminals of the network, (c) a transistor having emitter, base, and collector electrodes and having its collector connected to said second terminal, (d) a first resistor connected between the base of said transistor and said second terminal, (e) a second resistor having a resistance low compared with the resistance of said first resistor and connected between the emitter of said transistor and said first terminal to constitute with the emitter-collector path of said transistor a first direct-current path between said first and second terminals and to have a direct-current voltage drop produced across it with respect to direct current passing through the network from the positive terminal, and (*f*) a rectifier having a non-linear voltage-current characteristic connected between the base of said transistor and said first terminal with its forward direction of conduction away from the positive terminal, to constitute with said first resistor a second direct-current path between said first and second terminals and to have produced across it, when direct current of a value within the lower part of said working range passes through the network from the positive terminal to the negative terminal, a direct-current voltage drop that is of greater magnitude than the corresponding direct-current voltage drop across said second resistor; and to have produced across it, when such direct current is of a value within said upper part of said working range, a direct current voltage drop that is of lesser magnitude than the corresponding direct-current voltage drop across said second resistor, said transistor being thereby biased to a turned-on condition and to a turned-off condition, respectively, dependent upon said relative direct-current voltage drop magnitudes.

2. In a telephone system substation circuit adapted to be connected to line wires to an exchange and including an induction coil and a line winding of this induction coil, an automatic regulating arrangement for effecting automatic sensitivity regulation in dependence upon the magnitude of the direct current flowing in the line wires and supplied from the exchange, comprising a self-regulating two-terminal impedance network connected in series with said line winding, said impedancee network comprising in combination:

(*a*) a first terminal constituting one of the two terminals of the network, (*b*) a second terminal constituting the other of the two terminals of the network, (*c*) a transistor having emitter, base, and collector electrodes and having its collector connected to said second terminal, (*d*) a first resistor connected between the base of said transistor and said second terminal, (*e*) a second resistor having a resistance low compared with the resistance of said first resistor and connected between the emitter of said transistor and said first terminal to constitute with the emitter-collector path of said transistor a first direct-current path between said first and second terminals and to have a direct-current voltage drop produced across it with respect to direct current passing through the network from the positive terminal to the negative terminal, and (*f*) a rectifier having a non-linear voltage-current characteristic connected between the base of said transistor and said first terminal with its forward direction of conduction away from the positive terminal, to constitute with said first resistor a second direct-current path between said first and second terminals and to have produced across it, when direct current of a value within the lower part of said working range passes through the network from the positive terminal to the negative terminal, a direct-current voltage drop that is of greater magnitude than the corresponding direct-current voltage drop across said second resistor; and to have produced across it, when such direct current is of a value within said upper part of said working range, a direct current drop that is of lesser magnitude than the corresponding direct-current voltage drop across said second resistor, said transistor being thereby biased to a turned-on condition and to a turned-off condition, respectively, dependent upon said relative direct-current voltage drop magnitudes.

References Cited in the file of this patent

UNITED STATES PATENTS

| | | |
|---|---|---|
| 2,751,550 | Chase | June 19, 1956 |
| 2,818,470 | Busala | Dec. 31, 1957 |
| 2,993,092 | Herbig et al. | July 18, 1961 |
| 3,035,122 | Livingston | May 15, 1962 |

OTHER REFERENCES

Journal of the I.E.E., "Sensitivity Control for New Telephone Set," vol. 5, No. 54, June 1959, pp. 381–383.